United States Patent
Tankersley

(10) Patent No.: US 9,611,830 B1
(45) Date of Patent: Apr. 4, 2017

(54) HYDROELECTRIC POWER GENERATING DEVICE AND SYSTEM

(71) Applicant: Tom Tankersley, Marble Falls, TX (US)

(72) Inventor: Tom Tankersley, Marble Falls, TX (US)

(*) Notice: Subject to any disclaimer, the term of this patent is extended or adjusted under 35 U.S.C. 154(b) by 362 days.

(21) Appl. No.: 14/320,642

(22) Filed: Jul. 1, 2014

Related U.S. Application Data

(60) Provisional application No. 61/868,088, filed on Aug. 21, 2013.

(51) Int. Cl.
*F03B 13/08* (2006.01)
*F01D 15/10* (2006.01)

(52) U.S. Cl.
CPC ............ *F03B 13/083* (2013.01); *F01D 15/10* (2013.01); *F05B 2220/20* (2013.01); *F05B 2220/602* (2013.01); *Y02B 10/50* (2013.01); *Y02E 10/20* (2013.01)

(58) Field of Classification Search
CPC ....... F03B 17/005; F03B 13/086; F01D 15/08
USPC ....................................................... 415/203
See application file for complete search history.

(56) References Cited

U.S. PATENT DOCUMENTS

| | | | | |
|---|---|---|---|---|
| 1,010,609 A | * | 12/1911 | Fountain | E02B 9/00 405/75 |
| 4,272,686 A | * | 6/1981 | Suzuki | F03B 17/062 290/43 |
| 4,488,055 A | * | 12/1984 | Toyama | F03B 13/08 290/42 |
| 7,190,088 B2 | * | 3/2007 | Heidel | F03B 13/00 290/43 |
| 7,945,973 B2 | * | 5/2011 | Khorshid | E03C 1/055 251/129.04 |
| 9,045,995 B2 | * | 6/2015 | Graybill | F03B 13/00 |
| 2008/0217923 A1 | * | 9/2008 | Yen | F03B 13/00 290/54 |
| 2011/0188990 A1 | * | 8/2011 | Farb | F03B 13/00 415/1 |
| 2012/0286514 A1 | * | 11/2012 | Graybill | F03B 13/00 290/52 |

OTHER PUBLICATIONS

Hong Kong Polytechnic. "Electricity from Water Mains" Technology Frontier. Nov. 2012 accessed Aug. 26, 2016 from https://www.polyu.edu.hk/ife/corp/cntimgs/techfrontier/Printing_DM_ENG_Nov12.pdf.*

Saket, R.K. "Design Development and Reliability Evaluation of Micro Hydro Power Generation System Based on Municipal Waste Water" 2008 IEEE Electrical Power and Energy Conference Vancouver Oct. 6, 2008.*

* cited by examiner

*Primary Examiner* — Nathaniel Wiehe
*Assistant Examiner* — Topaz L Elliott
(74) *Attorney, Agent, or Firm* — James R Bell

(57) ABSTRACT

A fluid conduit includes an open chamber. A rotating device is mounted in the chamber. The rotating device includes a portion protruding through the open chamber and into the conduit. A plurality of fluid impingement surfaces are spaced apart on a surface of the rotating device, whereby fluid moving through the conduit impinges on the impingement surfaces and rotates the rotating device.

12 Claims, 3 Drawing Sheets

HYDROELECTRIC POWER GENERATING DEVICE AND SYSTEM

CROSS REFERENCE TO RELATED APPLICATIONS

The present application is related to and claims priority to Provisional U.S. Application No. 61/868,088 filed on Aug. 21, 2013, which is incorporated herein by reference in its entirety.

BACKGROUND

The disclosure relates to a device and system within a fluid conduit and more particularly to the device being rotated by fluid flowing through the conduit sufficient to generate electrical power.

Attempts have been made to generate electrical energy from fluid flow systems. It is important in such systems that the fluid flow in the conduit not be exposed to significant disruption, which may precipitate effects on other components within the fluid flow system such as pumps used to move the fluid through the conduit. It would be of benefit to provide an electrical power generating system within a fluid conduit capable of substantially maintaining a constant velocity and pressure in the conduit.

SUMMARY

A fluid conduit includes an open chamber. A rotating device is mounted in the chamber. The rotating device includes a portion protruding through the open chamber and into the conduit. A plurality of fluid impingement surfaces are spaced apart on a surface of the rotating device, whereby fluid moving through the conduit impinges on the impingement surfaces and rotates the rotating device.

DETAILED DESCRIPTION

This disclosure describes a new, innovative device and system for generating electricity for industrial, municipal, and commercial facilities. The device involves a rotatable member provided inside existing and operational water lines. The device is driven by existing water flow, gravity, and pressure points throughout pipeline networks that provide water to municipalities and other facilities. The power generated by the water through the spinning rotation of this device will function in any system used to pump 500 to 10,000 plus gallons of water per minute throughout existing water lines. This new device simultaneously captures and releases the water flow in route to its intended destination. The spinning rotation of the device is connected to generators that produce electricity. The disclosure describes the device and provides examples of implementation in existing water systems.

This disclosure includes a system that captures and transfers untapped energy within existing and operational pipeline networks in use on a daily basis. These pipeline networks are in use twenty-four hours a day, seven days a week and three-hundred and sixty-five days a year. This system involves very few moving parts. Already in existing municipalities and pipelines are billions of gallons of water in place and used daily to provide water for many purposes, such as drinking water, irrigation and sewage systems. Existing locations for this new system include water utilities, water storage facilities, municipalities, factories, universities, water parks, etc. Other prime locations include desalinization plants, offshore platforms, military facilities, petrochemical plants or other industries that use large volumes of water or fluids on a daily basis. This new system works in unison with all existing water or fluid systems, including other liquid transfer systems, to generate electricity.

Figure 1:
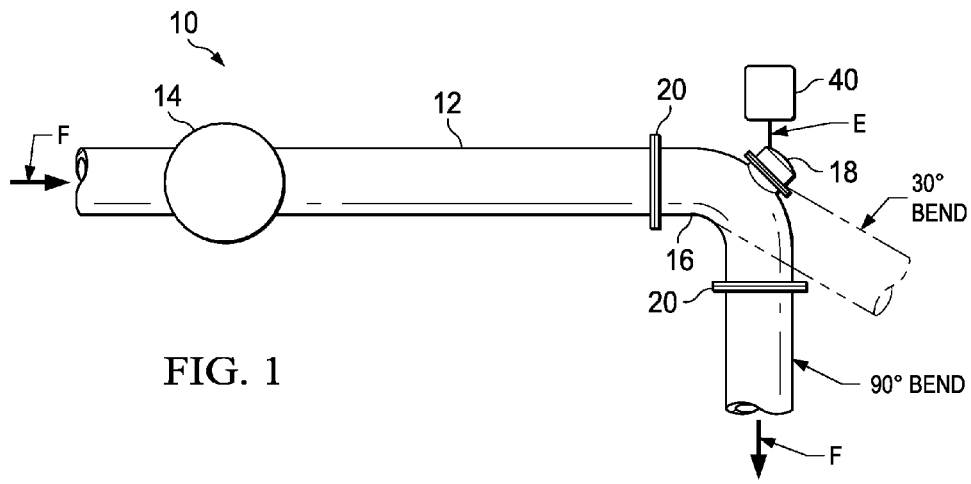
FIGS. 1 and 5 are diagrammatic illustrations of an embodiment of a portion of fluid conduit system.

The system 10, FIG. 1, includes a fluid conduit 12 having an energy source such as one or more pumps 14 for moving a fluid through the conduit 12 as indicated by the directional arrows designated F. An elbow portion 16 having a bend of about ninety degrees (90°) is provided in the conduit 12. The elbow portion 16 includes a chamber 18 and flanges 20. The elbow portion 16 may include a bend from about 30° to about 90°.

Figure 2:
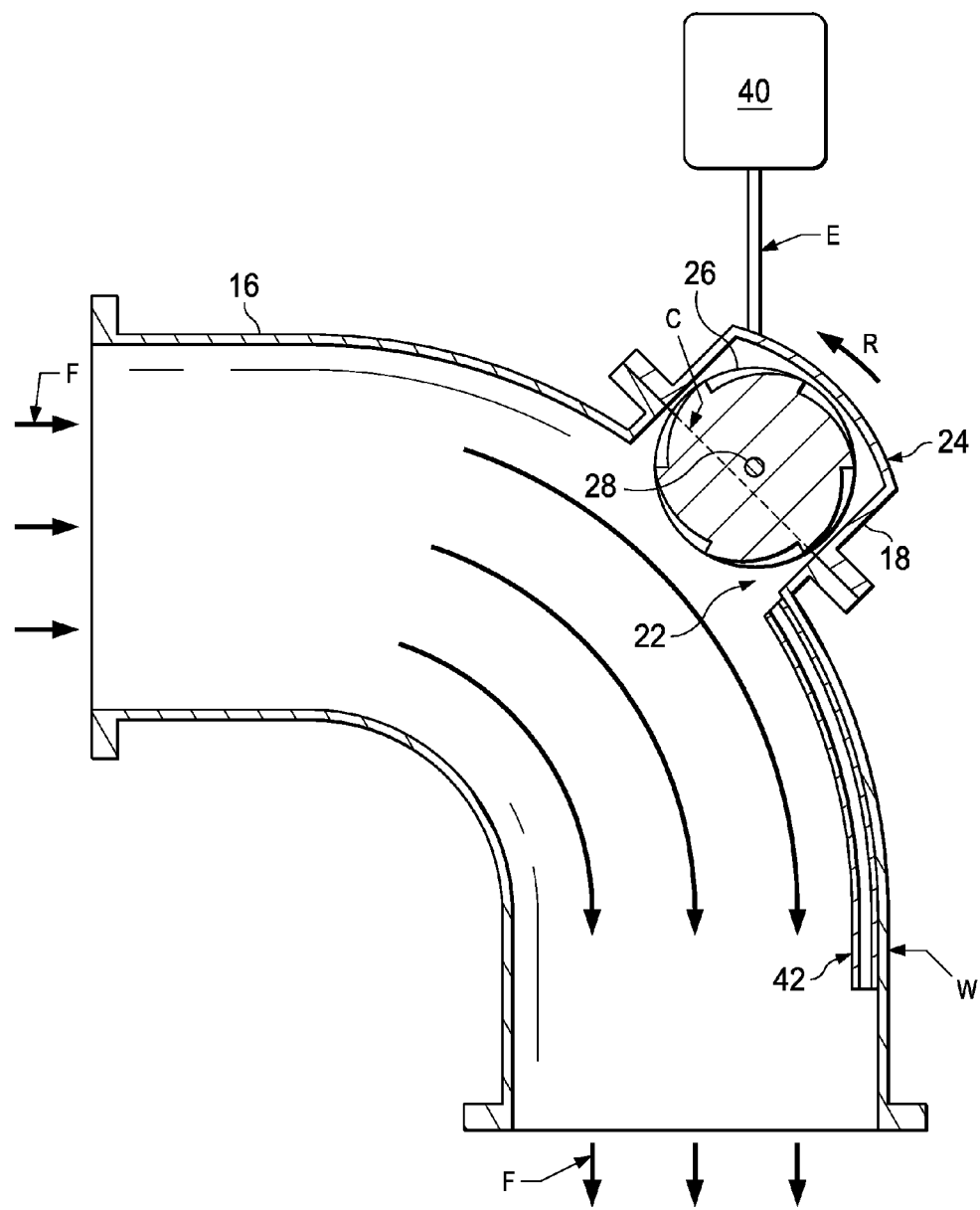
FIG. 2 is a cross-sectional side view illustrating an embodiment of an elbow including a rotating device.

In FIG. 2, the elbow portion 16 includes an opening 22 at a point where the chamber 18 attaches to the elbow portion 16. The chamber 18 includes a cap 24 which is separable from the elbow portion 16 along a line designated C, and this provides access to a rotating device 26 which is rotatable on a shaft 28. The shaft 28 is supported in the cap 24.

Figure 3:
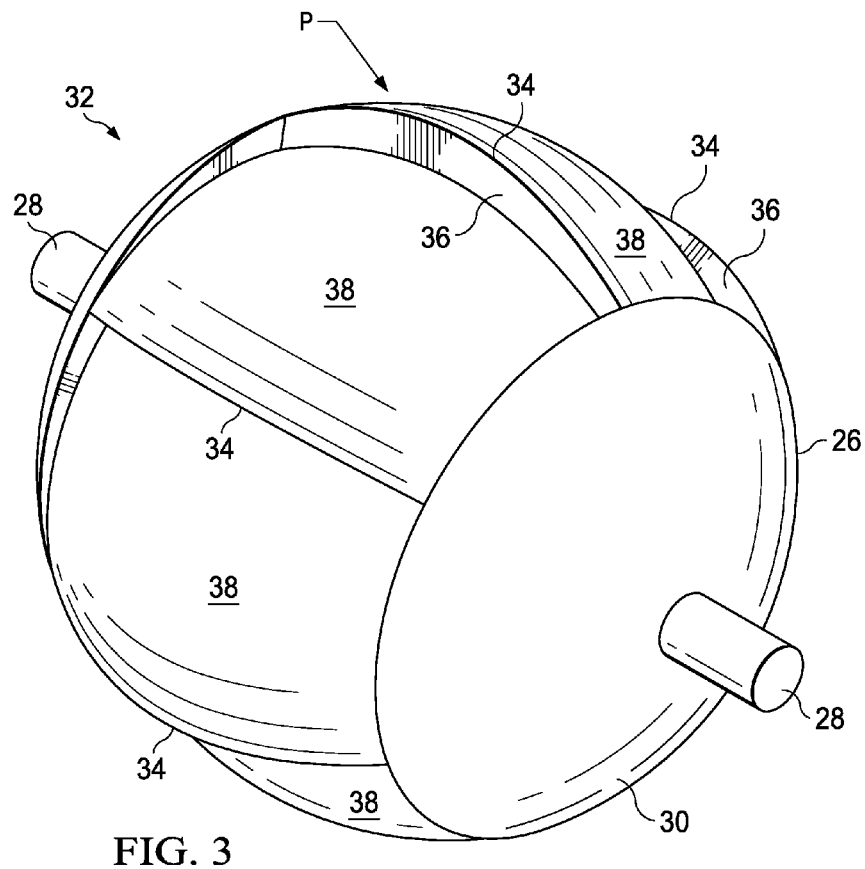
FIGS. 3 and 4 are perspective views illustrating embodiments of the rotating device of FIG. 2.

The rotating device 26 may be of various shapes and sizes but is illustrated in FIGS. 2 and 3 as a spherical device having a circumferential surface 30. As an example, a portion P of the circumferential surface 30 includes a serial row 32 of equally spaced apart steps 34 extending about surface 30. The steps 34 each include a lip 36 and a tapered pocket portion 38 extending to an adjacent lip 36. As a result of this structure, fluid F moving through conduit 12, impinges on the lips 36 of steps 34 of rotating device 26 causing rotation of the device in a direction R. Thus, energy E from the rotation may be provided to a generator 40 to generate electricity.

A siphon tube 42 extending from the opening 22 along a wall W of conduit 12, provides for siphoning fluid back into the conduit 12 from the chamber 18, in the event of fluid becoming trapped in chamber 18.

Figure 4:
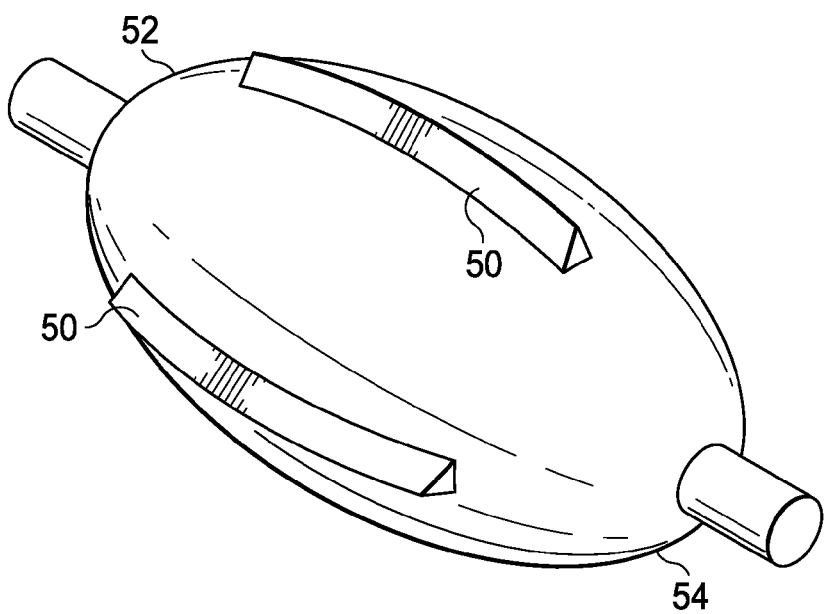

The rotating device may be of a spherical shape as illustrated in FIG. 3, or may be of an oblong shape as illustrated in FIG. 4. Also, the fluid impingement surfaces or steps 34, FIG. 3, which are recessed into the rotating device, may alternatively protrude, see FIG. 4, wherein the fluid impingement surfaces 50 protrude in a fin-like structure, from a peripheral surface 52 of a rotating device 54.

Figure 5:
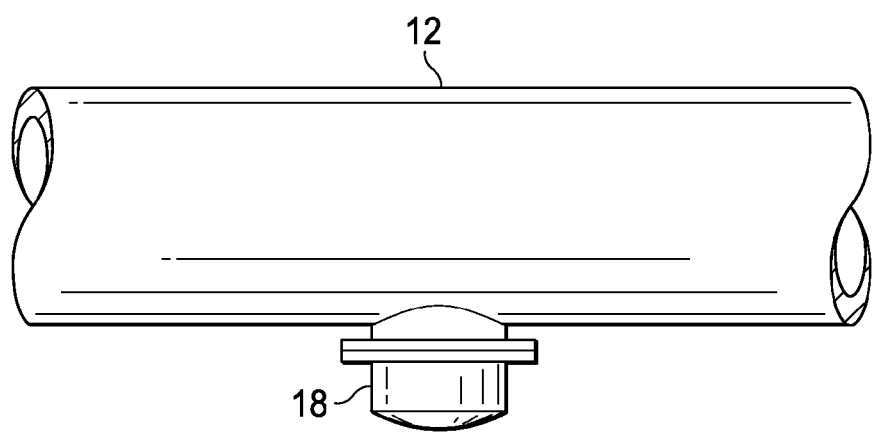

Other rotating device shapes and fluid impingement surface orientations are contemplated by the teachings of this disclosure. The rotating device is deemed to be positioned in the elbow or bend 16 of the conduit 12, however, other locations in the conduit 12 may be satisfactory. The conduit size is contemplated to be about a 12 inch to 24 inch diameter but is not considered to be limited to such dimensions. In FIG. 5, an alternative location for chamber 18, as described above, is located along a straight portion of conduit 12.

The foregoing has described a rotating device and system within a fluid conduit. The device is rotated by fluid flowing through the conduit sufficient to generate electricity.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
a fluid conduit;
the conduit including an open chamber;
a rotating device mounted in the chamber;
the rotating device including a portion protruding through an opening in the chamber and into the conduit;
a plurality of fluid impingement surfaces spaced apart on a surface of the rotating device, whereby fluid moving through the conduit impinges on the impingement surfaces and rotates the rotating device;
an elbow portion being a part of the fluid conduit, the chamber being positioned in the elbow portion, the chamber having an upstream portion and a downstream portion; and
a siphon tube extending along a wall of the elbow portion, the siphon tube having an inlet end and an outlet end, the inlet end being immediately adjacent the downstream portion of the chamber, whereby, in response to a primary flow of fluid through the elbow, the siphon tube conducts a secondary flow of fluid coaxially into the primary flow of fluid through the elbow.

2. The system of claim 1 wherein the rotating device is of a spherical shape.

3. The system of claim 1 wherein the rotating device is of an oblong shape.

4. The system of claim 1 wherein the fluid impingement surfaces are formed as pockets extending into a peripheral surface of the rotating device.

5. The system of claim 1 wherein the fluid impingement surfaces are formed as fins protruding outwardly from a peripheral surface of the rotating device.

6. The system of claim 1 wherein the elbow portion is curved at about a 90° turn.

7. The system of claim 1 wherein the elbow portion is curved at from about 30° to about 90°.

8. A method comprising:
providing an elongated fluid conduit with a curved conduit portion;
mounting a chamber in a surface of the curved conduit portion, the chamber having an opening providing fluid access to the chamber;
mounting a rotating device in the chamber, the rotating device including a peripheral surface protruding into the fluid conduit;
providing a plurality of fluid impingement surfaces on the peripheral surface of the rotating device, the fluid impingement surfaces extending into the fluid conduit, whereby fluid in the curved conduit portion of the fluid conduit accesses the opening to the chamber, impinges on the impingement surfaces and rotates the rotating device;
providing an upstream portion and a downstream portion in the chamber opening; and
extending a siphon tube along a wall of the curved conduit portion, the siphon tube having an inlet end and an outlet end, the inlet end being immediately adjacent the downstream portion of the chamber, whereby, in response to a primary flow of fluid through the curved conduit portion, the siphon tube conducting a secondary flow of fluid from the downstream portion of the chamber and returning the secondary flow of fluid coaxially into the primary flow of fluid through the curved conduit portion.

9. The method of claim 8 wherein the rotating device is of a spherical shape.

10. The method of claim 8 wherein the rotating device is of an oblong shape.

11. The method of claim 8 wherein the fluid impingement surfaces are formed as pockets extending into a peripheral surface of the rotating device.

12. The method of claim 8 wherein the fluid impingement surfaces are formed as fins protruding outwardly from a peripheral surface of the rotating device.

* * * * *